D. S. WAGENER.
Method of Grafting.
No. 107,427. Patented Sept. 13, 1870.
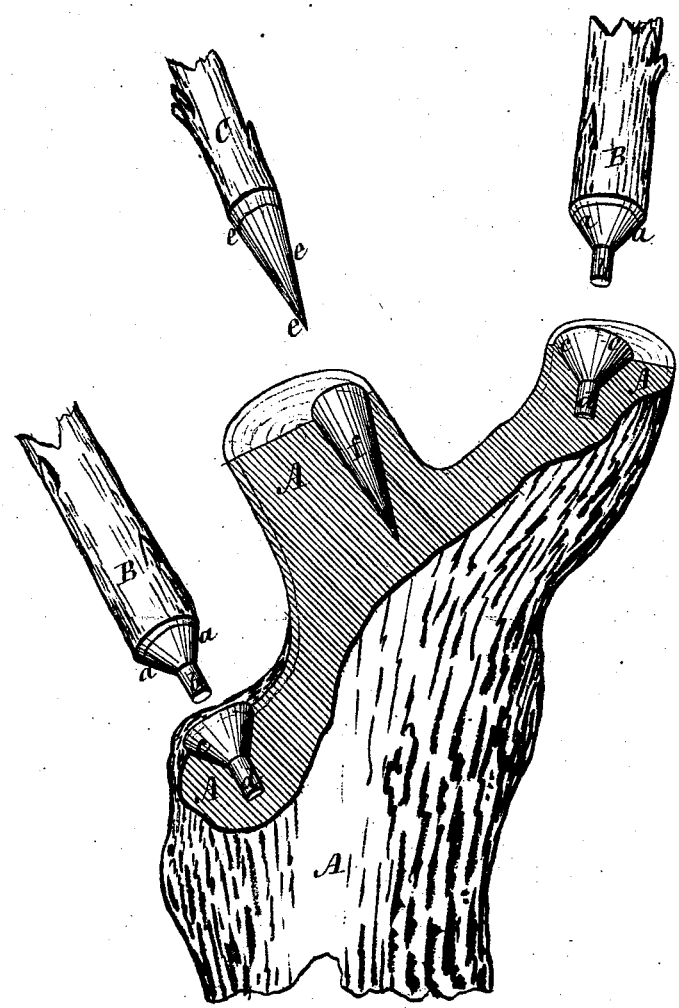

United States Patent Office.

DAVID S. WAGENER, OF PULTNEY, NEW YORK.

Letters Patent No. 107,427, dated September 13, 1870; antedated September 3, 1870.

IMPROVEMENT IN METHODS OF GRAFTING.

The Schedule referred to in these Letters Patent and making part of the same.

*To all whom it may concern:*

Be it known that I, DAVID S. WAGENER, of Pultney, in the county of Steuben and State of New York, have invented certain new and useful Improvements in Grafting; and that the following is a full, clear, and exact description of the same, reference being had to the accompanying drawings and letters of reference thereon.

My invention consists in a mode of grafting by making the seat for the scion of a conical form, and either in the top or in the side of the root or branch into which the graft is to be set, and fitting the graft accurately thereto, so that the alburnum of the two shall meet.

To enable others skilled in the art to make and use my invention, I will proceed to describe the same with reference to the drawings.

A represents a root, branch, or stock, into which the grafts may be set, as follows:

On the left of the figure the graft B is formed with a conical shoulder, $a$, and below it a peg, $b$; and in the branch, root, or stock, is cut or bored a seat, $c\ d$, the counterpart of the conical and cylindrical tenon $a\ b$, so that one shall fit the other neatly and exactly, and afford a support for the graft or scion.

At or on the scion C is cut a purely conical tenon, $e$, and in the stalk or root A is formed a purely conical seat, $f$, for such a tenon. This plan only differs from that above described in the lengthening of the cone and the absence of the peg. It affords, however, a firm support for the scion or graft C.

On the right of the figure is shown the same plan as that on the left, and only differs from it in this, that the graft is set in the head of the stalk in a more vertical position, whilst that at the left is inclined or oblique to the stalk. Either plan succeeds.

Having thus fully described my invention, I would state that I do not claim, broadly, beveling the seat for the graft; neither do I broadly claim cutting the scion in a wedge-form to fit the beveled seat; neither do I claim inserting the scion, by means of a round straight tenon, into a straight hole, for all these methods have been before practiced; but

What I do claim as my improvement, and desire to secure by Letters Patent, is—

The herein-described mode of grafting, by making the seat for the scion of a conical form, at right angles or obliquely to the root or branch into which the graft is set, and fitting the graft accurately thereto, in the manner herein shown and described.

DAVID S. WAGENER.

Witnesses:
    A. B. STOUGHTON,
    EDMUND MASSON.